US008748516B2

(12) United States Patent
Winterowd et al.

(10) Patent No.: US 8,748,516 B2
(45) Date of Patent: Jun. 10, 2014

(54) WOOD COMPOSITE WITH WATER-REPELLING AGENT

(75) Inventors: Jack G Winterowd, Puyallup, WA (US); Travis E. Bjorkman, Bonney Lake, WA (US); Erik M Parker, Meridian, ID (US)

(73) Assignee: Weyerhaeuser NR Company, Federal Way, WA (US)

( * ) Notice: Subject to any disclaimer, the term of this patent is extended or adjusted under 35 U.S.C. 154(b) by 233 days.

(21) Appl. No.: 12/414,834

(22) Filed: Mar. 31, 2009

(65) Prior Publication Data
US 2010/0249283 A1 Sep. 30, 2010

(51) Int. Cl.
| B29C 47/00 | (2006.01) |
| C10L 1/16 | (2006.01) |
| C10L 5/00 | (2006.01) |
| C10M 101/02 | (2006.01) |
| C10M 107/00 | (2006.01) |
| C10M 143/00 | (2006.01) |
| C10M 165/00 | (2006.01) |
| C10M 167/00 | (2006.01) |
| C10M 169/00 | (2006.01) |
| C10M 171/00 | (2006.01) |
| C10G 73/00 | (2006.01) |

(52) U.S. Cl.
USPC ............................ 524/13; 585/9; 208/24

(58) Field of Classification Search
USPC .................... 524/13; 585/9; 208/24
See application file for complete search history.

(56) References Cited

U.S. PATENT DOCUMENTS

| 4,410,595 A | 10/1983 | Matsumoto |
| 4,419,408 A | 12/1983 | Schmukler |
| 4,460,632 A | 7/1984 | Adur |
| 4,681,910 A * | 7/1987 | Crockatt et al. .............. 524/487 |
| 4,857,578 A * | 8/1989 | Hall .............. 524/488 |
| 5,223,122 A * | 6/1993 | Katayama ...................... 208/24 |
| 5,470,631 A | 11/1995 | Lindquist |
| 5,506,026 A | 4/1996 | Iwata |
| 5,525,394 A | 6/1996 | Clarke |
| 5,629,083 A | 5/1997 | Teodorczyk |
| 5,695,551 A * | 12/1997 | Buckingham et al. ............. 106/2 |
| 5,718,786 A * | 2/1998 | Lindquist et al. ............. 156/62.2 |
| 5,833,796 A | 11/1998 | Matich |
| 6,066,201 A | 5/2000 | Wantling |
| 6,074,548 A * | 6/2000 | Matzat et al. .................... 208/30 |
| 6,113,729 A | 9/2000 | Chiu |
| 6,355,333 B1 | 3/2002 | Waggoner et al. |
| 6,635,695 B2 | 10/2003 | Yoshida |
| 6,908,677 B2 | 6/2005 | Kiliman |
| 7,294,189 B2 | 11/2007 | Wantling |
| 7,371,787 B2 | 5/2008 | Preston et al. |
| 7,390,447 B1 | 6/2008 | Clark |
| 2001/0033922 A1 | 10/2001 | Schneider |
| 2002/0034629 A1 | 3/2002 | Jones |
| 2002/0081924 A1 | 6/2002 | Fensel |
| 2002/0157772 A1 | 10/2002 | Enlow |
| 2004/0013857 A1 * | 1/2004 | Winterowd et al. .......... 428/192 |
| 2005/0051921 A1 * | 3/2005 | Winterowd et al. .......... 264/109 |
| 2005/0055982 A1 | 3/2005 | Medina |
| 2006/0100340 A1 * | 5/2006 | Gao et al. ....................... 524/475 |
| 2006/0125152 A1 * | 6/2006 | Gardner et al. ............... 264/442 |
| 2006/0128886 A1 * | 6/2006 | Winterowd .................. 524/596 |
| 2006/0243323 A1 * | 11/2006 | Wantling et al. ........... 137/87.01 |
| 2006/0264519 A1 | 11/2006 | Eckert |
| 2007/0026228 A1 * | 2/2007 | Hartmann et al. .......... 428/402.2 |
| 2007/0027234 A1 | 2/2007 | Sigworth |
| 2007/0037001 A1 * | 2/2007 | Gao et al. ...................... 428/541 |
| 2007/0122558 A1 | 5/2007 | Gibiat |
| 2008/0160280 A1 | 7/2008 | Chen |
| 2010/0116406 A1 * | 5/2010 | Mahoney et al. ............... 156/39 |

FOREIGN PATENT DOCUMENTS

| EP | 396891 | 12/1995 |
| EP | 1204796 | 3/2003 |
| GB | 1148077 | 4/1969 |
| GB | 2420348 | 5/2006 |
| WO | 0158663 | 8/2001 |
| WO | 2006001717 | 1/2006 |
| WO | 2008014267 | 1/2008 |

OTHER PUBLICATIONS

Garai et al. Journal of Dispersion Science and Technology, 26, 9-18, 2005.*
Roffael, E., et al., "Paraffin Sizing of Particleboards: Chemical Aspects", Proceedings of the Seventeenth Washington State University International Particleboard/Composite Material Series, Mar. 29-31, 1983, Pullman, Washington, US.
Najafi, S.K., et al."Effects of water absorption on creep behavior of wood-plastic composites", Dept of Wood & Paper Sci & Technol., Tarbiat Modares Univ, Noor Iran, Journal of Composite Materials, vol. 42, No. 10, p. 993-1002, Sage Publications, May 2008.
Adhikary, K.B., et al., "Dimensional stability and mechanical behaviour of wood-plastic composites based on recycled and virgin high-density polyethylene (HDPE)" Dept of Chem & Process Eng.,Univ. of Canterbury, Christchurch, New Zealand, Composites Part B: Engineering, vol. 39, No. 5, p. 807-815, Elsevier Science Ltd., Jul. 2008.

(Continued)

*Primary Examiner* — Liam J Heincer
(74) *Attorney, Agent, or Firm* — Christensen O'Connor; Johnson Kindness PLLC

(57) ABSTRACT

The present disclosure includes a wood composite made from cellulosic particles, a binder, and a water-repelling agent. In some embodiments, the water repelling agent includes aliphatic compounds having a molecular distribution between about 16 and about 36 carbon atoms per molecule. In some embodiments, the water-repelling agent has an average molecular weight of about 220 to about 350 Daltons (solids portion). The water-repelling agent may be applied as a wax emulsion or in neat wax form. The present disclosure also relates to a method for manufacturing a wood composite as described above.

15 Claims, 1 Drawing Sheet

(56) References Cited

OTHER PUBLICATIONS

Yeh, SK., "Improved wood-plastic composites through better processing", W Virginia Univ, Dept Chem Engn, POB 6102, Morgantown, WV, Composites Part-A—Applied Science and Manufacturing, 2008, vol. 39, No. 11 (Nov.), p. 1694-1699.

Migneault, S. et al., "Effect of fiber length on processing and properties of extruded wood-fiber/HDPE composites", Journal of Applied Polymer Science, 2008, vol. 110, No. 2 (Oct. 15), p. 1085-1092.

Rodríguez-Valverde, M.A., et al., "Influence of Oil Content in Paraffins on the Behavior of Wax Emulsions: Wetting and Rheology," Journal of Dispersion Science and Technology 27(2):155-163, 2006.

* cited by examiner

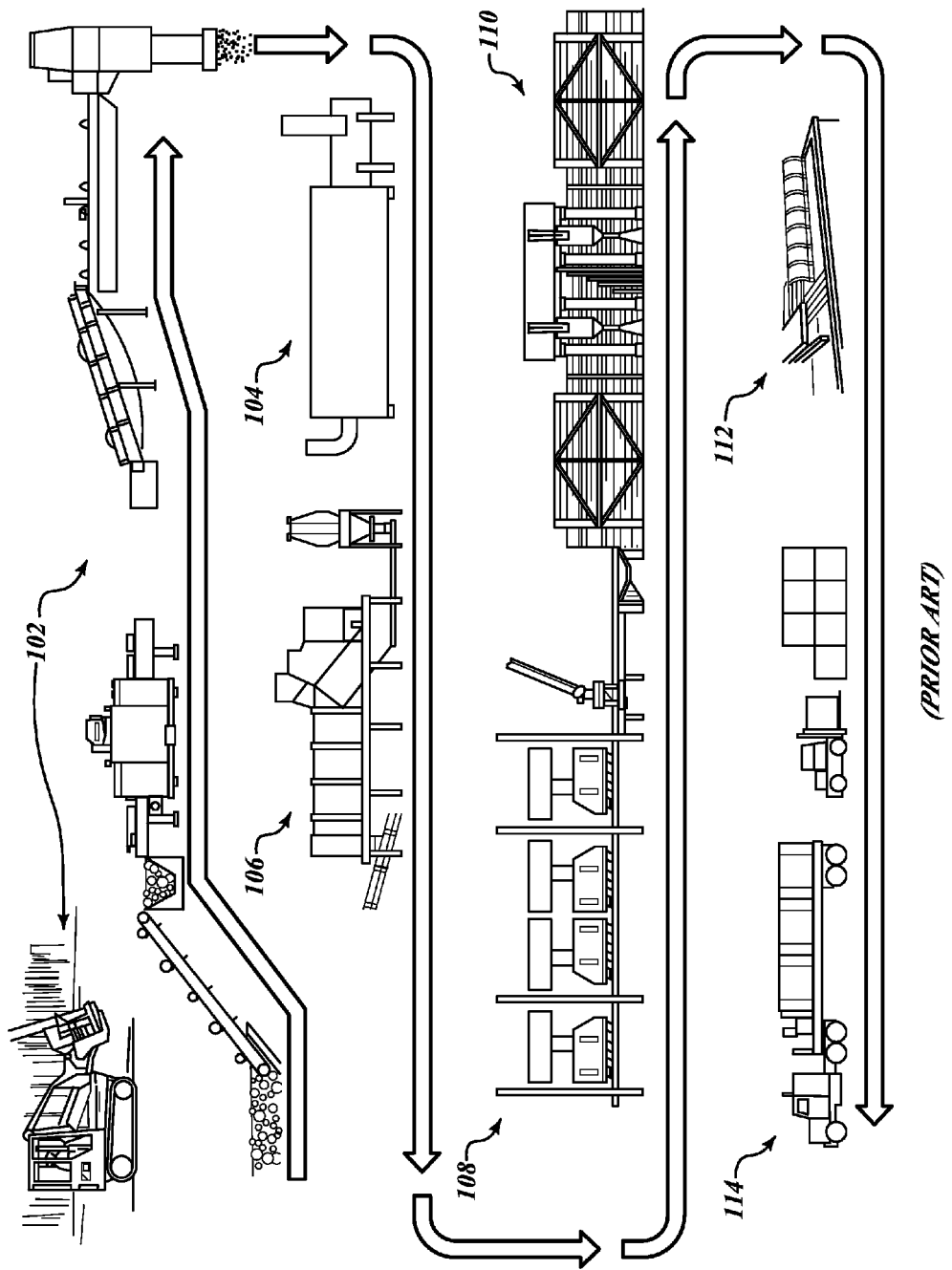

WOOD COMPOSITE WITH WATER-REPELLING AGENT

TECHNICAL FIELD

The present disclosure is directed generally to wood composites and methods of making wood composites with a water-repelling agent. The water-repelling agent is applied during the manufacture of the wood composite and serves to inhibit water absorption.

BACKGROUND

Various types of engineered wood composites (e.g., oriented strand board, parallel strand lumber, laminated veneer lumber, and equivalents) are known and used in the construction of commercial and residential structures. Common applications for such wood composites include roof sheathing, wall sheathing, columns, flooring, structural insulated panels, engineered wood components (e.g. I-joists), cabinetry, and furniture. Most of these applications involve the risk of exposure to moisture. When a wood composite absorbs water, it will undergo dimensional change that is generally only partially reversible. Most wood composites are anisotropic with respect to their potential for dimensional change. Upon absorption of water, most wood composites will undergo greater expansion in the thickness dimension (on a percentage basis) than they will in the length or width dimensions. Depending on the moisture exposure conditions and duration, the increase in dimension might be predominantly localized, or alternatively, it might be essentially uniform. In either case, a dimensional change usually makes the wood composite more difficult to assemble or incorporate into a structure such as the floor, wall or roof of a building. Alternatively, wood composites may remain dry before assembly and subsequently encounter a condition which exposes the structure to water. Under these conditions, the wood composite parts may undergo dimensional changes that can result in problems such as buckling at joints or edge swell along seams in a roof, wall or floor system.

In addition to the problems discussed above, water absorption causes other problems in wood composites. For example, wood composites may undergo a loss of mechanical strength when subjected to water. Biological degradation may also be an issue when wood composites are hydrated to a threshold moisture content or higher. In general, exposure to water can substantially slow down the building process of a structure involving wood composites or compromise the durability and functionality of an existing structure.

The industry has long recognized the problems associated with water absorption in wood composites and has taken steps to inhibit the occurrence of water absorption and/or its effects. One approach is to incorporate a water-repelling agent during the process of producing the wood composite. Wood-based composites are generally made using a process similar to the schematic illustrated in FIG. 1. Referring to FIG. 1, wooden logs are cut into smaller wooden elements as depicted by the schematic step 102. A blender or other mixing device is used to apply a binder (e.g., a resin) and a water-repelling agent to the wooden elements as depicted in schematic step 106. The wooden elements are formed into a mat as shown in schematic step 108 and the mat is consolidated under heat and pressure as shown in schematic step 110. In most processes the wooden elements are subjected to a drying step (e.g., schematic step 104) at some point prior to the consolidation (schematic step 108). Additional processing steps may optionally be performed prior to the consolidation (schematic step 108) such as hydrating the wooden logs prior to refining; and screening and fractionating the wooden elements into different size classes prior to treatment with the binder and water-repelling agent. Additional procedures may optionally be performed after consolidation (schematic step 108) such as trimming and sawing the consolidated product into smaller pieces (e.g., schematic step 112), post-cooling, post-heating, grading, sorting, sanding, marking, labeling, stacking, sealing, packaging, and transporting (e.g., schematic step 114).

In general, two major categories of water-repellants have been used in the production of wood composites: wax emulsions and neat wax. By far, the most common wax products that have been used in the production of wood composites over the past fifty years are aqueous slack wax emulsions and neat (non-emulsified and non-aqueous) slack wax.

In North America, "slack wax" is produced by refining petroleum-derived lubricating oils, which are comprised of petroleum-derived hydrocarbon mixtures. Individual hydrocarbons in these mixtures that are liquids at standard temperature and pressure are categorized as "oils." Slack waxes can be refined to have an oil-content as broad as 3% to 50%, but slack wax products used as water-repelling agents for wood composites commonly have an oil content of about 5% to 20%. The number of carbon atoms per molecule for the solid compounds in slack wax is known to be in the range of about 18 to about 48, but most of these compounds are in the range of about 36 to about 45 carbon atoms per molecule. The average molecular weight of the solid compounds of the wax component in slack wax in North America is about 500 to about 700 Daltons. The melt point of slack wax is dependent upon both the average molecular weight and the oil content. Slack waxes produced in North America commonly have a melt point of about 55° C. to about 70° C.

As an alternative to slack wax, "paraffin wax" has been considered for use in the production of wood composites. Like slack wax, paraffin is commercially available as a wax emulsion or neat wax form. Paraffin wax is also manufactured by refining petroleum-derived lubricating oils. Compared to slack wax, paraffin wax has a lower oil content (0% to 1%) and the solid compounds have a lower average molecular weight (360 to about 500 Daltons). Paraffin wax has a molecular distribution that predominantly ranges between about 20 and about 38 carbon atoms per molecule, such that the melt point ranges between about 48° C. to about 58° C.

In North America, there is a strong preference for slack wax as a water-repellant for wood composites. The preference is due to the fact that slack wax is readily available at a relatively low price; it is safe to use; and it can be converted into a low-viscosity liquid, either by melting or by emulsification in an aqueous medium. Notably, incorporation of molten slack wax or emulsified slack wax into a wood composite significantly reduces the rate at which the composite absorbs liquid water. Manufacturers of wood composites generally prefer to use emulsified slack wax over neat molten slack wax because the emulsified slack wax does not require a heated storage, transfer and application system. Other wax products have been contemplated as alternatives, but upon evaluation were found to be less desirable than slack wax due to inferior performance and/or unfavorable economics.

For example, in one experiment, particleboard was made with three different types of anionic, aqueous hydrocarbon emulsions. Roffael, E. & May, H., -A., "Paraffin Sizing of Particleboards: Chemical Aspects", in *Proceedings of the Seventeenth Washington State University International Particleboard/Composite Materials Series*, (1983) ed. Maloney, T. M., p 283-295. The hydrocarbons used in these emulsions were reported to be either C20 paraffin, C28 paraffin or C36 paraffin. Id. Thus, these emulsions were quite unique in that the hydrocarbon components were not mixtures. Particleboards made with these emulsified water-repelling agents reportedly exhibited slower rates of water absorption and swelling as the size of the paraffin component in the emulsion increased. Id.

In a second part of the same study, particleboard was made with two different "commercially practical paraffins", which were referred to as type I and type II. Id. The type I wax was reportedly comprised predominantly of C18 to C42 and had an oil content of 1.5% to 2.0% and a melt point of 51° C. to 53° C. Id. The type II wax was reportedly comprised predominantly of C16 to C30 and had an oil-content of 4.0% to 5.0% and a melt point of 42° C. to 44° C. Id. Particleboard made with the type I wax at a 0.25% loading level reportedly exhibited slower rates of thickness swell than particleboard made with the type II wax at a 0.25% loading level. Id. It should be noted that it is somewhat unclear in the second part of this experiment as to whether or not the "commercially practical paraffins" were applied as neat molten liquids or in emulsified form.

This publication and others generally show that when petroleum-derived waxes are used as a water-repelling agent in a particleboard application, higher molecular weight waxes are more effective than lower molecular weight waxes. Because the molecular weight of slack wax is greater than that of paraffin wax, the logical inference is that slack wax should perform better than paraffin wax in situations involving the use of these materials as water-repelling agents for wood composites. In consideration of the fact that paraffin wax is more expensive than slack wax, there would be little reason for any manufacturer to actually use paraffin wax as long as slack wax is available.

One drawback is that high levels of slack wax may interfere with the bonding action between wood elements and thus reduce the strength of the product. This presents a dilemma when one is attempting to make a wood composite that may simultaneously repel water and may have adequate strength properties for the particular application. In addition, the price of slack wax has risen over the years. Although slack wax is generally less expensive than paraffin wax, wax components represent a significant cost in the wood composite. There has been a trend in which petroleum refiners have reduced their production of the "lube stocks" that are used to make wax so that they can increase the yield of more profitable gasoline components, such as benzene and toluene. This shift in the refining practice has resulted in periodic shortages of slack wax in North America.

Thus, there is a need in the industry for alternative formulations for water-repelling agents for use in wood composites, which do not substantially impair the strength of the wood composite. There is also a need to develop an alternative formulation which does not significantly increase the cost of production when compared to conventional methods. There is also a need to develop a process for making a wood composite that employs alternative water-repelling agents.

SUMMARY

The following summary is provided for the benefit of the reader only and is not intended to limit in any way the invention as set forth by the claims. The present disclosure is directed generally towards wood composites and methods of making wood composites with a water-repelling agent.

In one embodiment, the disclosure includes a wood composite made from cellulosic particles, a binder and a water-repelling agent. In some embodiments, the water-repelling agent has an average molecular weight of about 220 to about 350 Daltons (solids portion). In some embodiments, approximately 75% or more of the water-repelling agent includes aliphatic compounds having a molecular distribution between about 16 and about 36 carbon atoms per molecule. In some embodiments, the aliphatic compounds are an alkane mixture formulated so that the water-repelling agent has a melt point between about 18° C. and about 48° C. and an oil content of less than about 3%. The water-repelling agent is configured to inhibit the wood composite's absorption of water. It may be applied during the production of the wood composite in the form of a neat wax or a wax emulsion.

Further aspects are directed towards a method for making a wood composite, which involves forming a wood composite formulation and compressing the wood composite formulation under heat and pressure. The wood composite formulation includes cellulosic particles, a binder, and a water-repelling agent. The water-repelling agent may be in the form of a neat wax or a wax emulsion. In some embodiments, the water repelling agent includes aliphatic compounds having a molecular distribution between about 16 and about 36 carbon atoms per molecule. In some embodiments, the water-repelling agent has an average molecular weight of about 220 to about 350 Daltons (solids portion). In some embodiments, the aliphatic compounds are an alkane mixture and the water-repelling agent is formulated to have a melt point between about 18° C. and about 48° C. and oil content less than about 3%. The water-repelling agent is configured to inhibit the wood composite's absorption of water without significantly diminishing the strength of the composite.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows:

FIG. 1 is a schematic flow diagram for a process for manufacturing wood composites known in the art.

DETAILED DESCRIPTION

The present disclosure describes wood composites with a water-repelling agent and methods of making wood composites with a water-repelling agent. Certain specific details are set forth in the following description and FIG. 1 to provide a thorough understanding of various embodiments of the disclosure. Well-known structures, systems, and methods often associated with such systems have not been shown or described in details to avoid unnecessarily obscuring the description of various embodiments of the disclosure. In addition, those of ordinary skill in the relevant art will understand that additional embodiments of the disclosure may be practiced without several of the details described below.

In this disclosure, the term "wood" is used to refer to any organic material produced from trees, shrubs, bushes, grasses or the like. The disclosure is not intended to be limited to a particular species or type of wood. The term "wood composite" is used to refer to a wood-based compound utilizing wood fibers, reconstituted wood or another wood derivative (e.g., particleboard, fiberboard, oriented strand board, laminated strand lumber, plywood, laminated veneer lumber, parallel strand lumber). The term "cellulosic particles" is used to refer to particles derived from wood used to form a wood composite. Cellulosic materials in this disclosure include, but are not limited to strands, veneer strands, slats, straw, fibers, particles, flour, and other. The term "slack wax" is used to refer to petroleum-derived hydrocarbon mixtures having an oil content of about 3% to about 50%, an average molecular weight of about 500 to about 700 Daltons (solids portion) and a melt point of about 55° C. to about 70° C. The term "paraffin wax" is used to refer to petroleum-derived hydrocarbon mixtures having an oil content of about 1% or less, an average molecular weight of about 360 to about 500 Daltons (solids portion), and a melt point of about 48° C. to about 58° C. The term "moisture content" is used to refer to 100% times the mass of water in a wood composite divided by the completely dry mass of the wood composite.

Specifically this disclosure relates to a wood composite made from cellulosic particles, a binder, and a water-repelling agent. In some embodiments, the compositions of the wood composite may be approximately 50.0% to approximately 99.5% cellulosic particles (on a dry basis); approximately 0.1% to approximately 20% binder (on a dry basis); and approximately 0.1% to about 5.0% water-repelling agent. Some embodiments of the disclosure involve the water-repelling agent being applied to the cellulosic particles in the form of a wax emulsion, whereas other embodiments involve the water-repelling being applied in the form of a neat wax. In embodiments involving both the neat wax form of the water-repelling agent and the wax emulsion form of the water-repelling agent, the wood composite may be produced using conventional techniques similar to the schematic shown, for example, in FIG. 1.

According to the disclosure, cellulosic particles are mixed with a binder and a water-repelling agent in a blender or other mixing device, for example, as shown in schematic step 106 to form a wood composite formulation. In embodiments involving wax emulsion, the wood composite formulation is formed using a water-repelling agent that is in emulsion form. In embodiments involving neat wax, the wood composite formulation is formed using a water-repelling agent that is in the form of a non-aqueous and non-emulsified wax. Suitable binders for embodiments of the disclosure include multifunctional isocyanates, such as polymeric diphenylmethylene diisocyanate, emulsion polymer isocyanate, urethanes; phenol/formaldehyde resin, urea/formaldehyde resin, melamine/formaldehyde, melamine/urea/formaldehyde, phenol/urea/melamine/formaldehyde, resorcinol/formaldehyde, phenol/resorcinol/formaldehyde; polyvinylacetate, polyvinyl alcohol; epoxies, acrylic resin; polysaccharides, such as starch, dextrin, hydroxyethyl cellulose, methyl cellulose, alginates and chitosan; and proteins, such as casein, soy-based glue, blood glue, hide glue and bone glue.

In some embodiments, the water-repelling agent has an average molecular weight of about 220 to about 350 Daltons (solids portion). Preferably, the molecular weight is about 300 to about 350 Daltons (solids portion). Those skilled in the art will appreciate that the range of molecular weight is significantly lower than the molecular weights of compounds used to make conventional water-repelling agents (e.g., slack wax). Typically compounds having a molecular weight within the range of 500 to 700 Daltons (solids portion) are used for water-repelling applications in wood composites because higher molecular weight waxes are expected to be more effective than lower molecular weight waxes in inhibiting water absorption in wood composites.

The water-repelling agent according to the disclosure comprises aliphatic compounds and optionally additional compounds. In some embodiments, the aliphatic compounds are approximately 75% of the water-repelling agent. In some embodiments, the aliphatic compounds may be more than 75% of the water-repelling agent.

The aliphatic compounds may be, for example, a mixture of alkanes having a molecular distribution between about 16 and about 36 carbon atoms per molecule. Alkane mixtures according to the disclosure may be produced by refining certain crude petroleum in a manner that is similar to that used to produce slack wax and paraffin wax while adjusting the distillation conditions to obtain a lower molecular weight. In some embodiments, the water-repelling agent also includes aromatic compounds, alkenes, alkynes, alkanes having a molecular distribution less than about 16 carbon atoms per molecule, alkanes having a molecular distribution greater than about 36 carbon atoms per molecule, and other organic compounds.

In some embodiments, the water-repelling agent has a melt point between about 18° C. and about 48° C. Preferably the melt point is between about 40° C. and about 48° C. Those skilled in the art will appreciate that water-repelling agents commonly used in the art typically have a higher melt point than that of water-repelling agents according to some embodiments of the disclosure.

In some embodiments, the water-repelling agent has an oil content of less than about 3%. Preferably, the oil content is lower than about 2.5%. In some embodiments, the water-repelling agent may contain no oil. Those skilled in the art will appreciate that water-repelling agents commonly used in the art typically have higher oil content than that of water-repelling agents according to some embodiments of the disclosure.

After the wood composite formulation is produced, it is formed into a mat and compressed under heat and pressure using conventional techniques known in the art (e.g., platen pressing) to form a wood composite. The wood composite may be particleboard, fiberboard, oriented strand board, laminated strand lumber, parallel strand lumber, or other similar composites. The water-repelling agent is effective to reduce water absorption in the wood composite when compared to a wood composite without a water-repelling agent. In addition, a relatively low level of water-repelling agent is required when compared with conventional methods. In some embodiments, a sample of the wood composite having dimensions of about 8 inches by 16 inches by 0.72 inches has a moisture content of about 40% after being immersed in water for approximately two days. Subsequently, the wood composite may undergo additional post-compression steps known in the art such as trimming, sawing, grading, sorting, sanding, marking, labeling, stacking, sealing, packaging, and shipping.

Contrary to traditional notions about the effectiveness of water-repelling agents, water-repelling agents according to the disclosure are expected to inhibit water absorption in wood composites. In addition, the water-repelling agent according to some embodiments of the disclosure may have other benefits. For example, it may increase the level of tack on the surface of the cellulosic particles, which accordingly promotes consolidation of the wood composite formulation during compression. Some embodiments of the disclosure may also result in a product with higher strength properties than products made using conventional methods. Some embodiments may reduce the cost of manufacturing wood composites when compared with conventional methods because a relatively low level of the water-repelling agent (when compared with conventional methods and formulations) is needed to achieve desired properties.

From the foregoing, it will be appreciated that the specific embodiments of the disclosure have been described herein for purposes of illustration, but that various modifications may be made without deviating from the disclosure. For example, the wood composite may be produced with forming and compressing techniques that are not specifically mentioned in the disclosure, but are known to those skilled in the art.

Aspects of the disclosure described in the context of particular embodiments may be combined or eliminated in other embodiments. For example, aspects of the wax emulsion embodiments and the neat wax embodiments may be combined or eliminated.

Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

The following examples will serve to illustrate aspects of the present disclosure. The examples are intended only as a means of illustration and should not be construed to limit the scope of the disclosure in any way. Those skilled in the art will recognize many variations that may be made without departing from the spirit of the disclosure.

Example 1

A conventional water repellant, known as 431B, was manufactured by the International Group Incorporated having a mixture of hydrocarbons derived from petroleum. Specifically, over 90% of the solid hydrocarbons were either branched or normal alkanes that had between about 24-60 carbon atoms. The weight-average molecular weight of the branched and normal alkanes was about 520 Daltons. The oil content of the total mixture was about 10-20% (determined by ASTM D721) and the melt point was about 67.5° C. (determined by ASTM D87).

Oriented strand board that was representative of conventional oriented strand board was produced on a laboratory scale in the following manner. Wooden strands (25-45 mils thick, 0.25-1.5 inches wide, 0.25-5.0 inches long, aspen and poplar species) designated as "core-layer strands" were dried to a moisture content of about 1.5-2.5% and were then transferred into a front load, cylindrical-shaped blender compartment (2 feet depth, 6 feet diameter). The axis of rotation of the blender was parallel to the laboratory floor. The rotating interior surface of the blender compartment was equipped with pegs (2 inches height, 0.25 inches diameter). The rotation rate of the blender was set to a speed appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins.

The conventional slack wax, known as 431B was heated to a temperature of 225° F. and then sprayed onto the wooden strands at a loading level of 0.25% based on the dry mass of the wood. An isocyanate-based bonding resin was then sprayed onto the strands at a loading level of 5.0% based on the dry mass of the wood. The treated core-layer strands were then removed from the blender.

Additional wooden strands (25-45 mils thick, 0.25-1.5 inches wide, 0.25-5.0 inches long, aspen and poplar species) designated as "surface-layer strands" were dried to a moisture content of about 1.5-2.5% and were then loaded into the blender compartment. The conventional slack wax, known as 431B was heated to a temperature of 225° F. and then sprayed onto the wooden strands at a loading level of 0.25% based on the dry mass of the wood. A phenol-formaldehyde based bonding resin was then sprayed onto the strands at a loading level of 5.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24 inches and the width of the mat was also 24 inches. The strands in the surface layers were oriented in a direction that was generally parallel to one of the major axes of the mat, while the strands in the surface layer were oriented in a direction that was generally parallel to the other major axis of the mat. The mass of each of the four layers was about 1070-1085 g. The thickness of the mat was about 5 inches.

The mat, as well as the caul plate and screen that were supporting the mat, were then transferred onto the bottom platen of an open hot press. The top and bottom platens were maintained at a surface temperature of 405° F. A control system was immediately activated in order to begin closing the gap between the top and bottom platens until the distance between them was 0.719 inches. The time required to achieve this compression process was about 60 seconds. The maximum pressure exerted on the mat was about 500-650 psi. The gap between the platens was maintained at 0.719 inches for a period of 190 seconds and was then increased to 0.749 inches over a period of 30 seconds. The gap between the platens was then rapidly opened and the resulting, consolidated oriented strand board panel was removed from the press.

The hot oriented strand board panel was then transferred into an oven and was maintained at a set temperature and relative humidity for a specific period of time. Three replicate panels were made in this manner. One test specimen (8 inches by 16 inches) was cut from each conditioned laboratory panel. Each test specimen was weighed and measured for thickness at five marked locations along the center of the specimen. Each test specimen was then submerged under 1 inch of water at temperature of 20° C. for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen. Based on these measurements calculations were made regarding the moisture content and the thickness swell that occurred during the water-soak procedure. In general, the following formulas were used for the calculations:

Moisture Content=100% (water mass in the specimen)/(dry mass of the specimen)

Wet Thickness Swell=100% (thickness after soaking for two days−initial thickness)/(initial thickness)

Redry Thickness Swell=100% (thickness after redry−initial thickness)/(initial thickness)

Table 1 summarizes the results. Eighteen test specimens (2 inches by 2 inches) were also sampled from these panels and the internal bond strength of each specimen was measured using ASTM D905. The average value was 85.5 psi.

TABLE 1

Test values for oriented strand board made with conventional slack wax

| SAMPLE | MOISTURE CONTENT (%) AFTER SOAKING FOR TWO DAYS | THICKNESS SWELL (%) AFTER SOAKING FOR TWO DAYS | THICKNESS SWELL (%) AFTER SOAKING FOR TWO DAYS & THEN DRYING FOR TWO DAYS |
|---|---|---|---|
| 1 | 52.4 | 18.8 | 12.2 |
| 2 | 48.4 | 16.7 | 11.9 |
| 3 | 47.1 | 17.3 | 11.9 |
| AVERAGE | 49.3 | 17.6 | 12.0 |

Example 2

Wax-free oriented strand board was produced on a laboratory-scale in the following manner. Wooden strands (25-45 mils thick, 0.25-1.5 inches wide, 0.25-5.0 inches long, aspen and poplar species) designated as "core-layer strands" were dried to a moisture content of about 1.5-2.5% and were then transferred into a front-load, cylindrical-shaped blender compartment (2 feet depth, 6 feet diameter). The axis of rotation of the blender was parallel to the laboratory floor. The rotating interior surface of the blender compartment was equipped with pegs (2 inches height, 0.25 inches diameter). The rotation rate of the blender was set at a rate appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. An isocyanate-based bonding resin was then sprayed onto the strands at a loading level of 5.0% based on the dry mass of the wood. The treated core-layer strands were then removed from the blender.

Additional wooden strands (25-45 mils thick, 0.25-1.5 inches wide, 0.25-5.0 inches long, aspen and poplar species) designated as "surface-layer strands" were dried to a moisture content of about 1.5-2.5% and were then loaded into the blender compartment. A phenol-formaldehyde based bonding resin was then sprayed onto the strands at a loading level of 5.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24 inches and the width of the mat was also 24 inches. The strands in the surface layers were oriented in a direction that was generally parallel to one of the major axis of the mat, while the strands in the surface layer were oriented in a direction that was generally parallel to the other major axis of the mat. The mass of each of the four layers was about 1070-1085 g. The thickness of the mat was about 5 inches.

The mat, as well as the caul plate and screen that were supporting the mat, were then transferred onto the bottom platen of an open hot press. The top and bottom platens were maintained at a surface temperature of 405° F. A control system was immediately activated in order to begin closing the gap between the top and bottom platens until the distance between them was 0.719 inches. The time required to achieve this compression process was about 60 seconds. The maximum pressure exerted on the mat was about 500-650 psi. The gap between the platens was maintained at 0.719 inches for a period of 190 seconds and was then increased to 0.749 inches over a period of 30 seconds. The gap between the platens was then rapidly opened and the resulting, consolidated oriented strand board panel was removed from the press.

The hot oriented strand board panel was then transferred into an oven and was maintained at a set temperature and relative humidity for a specific period of time. Three replicate panels were made in this manner. One test specimen (8 inches by 16 inches) was cut from each conditioned laboratory panel. Each test specimen was weighed and measured for thickness at five marked locations along the center of the specimen. Each test specimen was then submerged under 1 inch of water at a temperature of 20° C. for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen Based on these measurements calculations were made regarding the moisture content and the thickness swell that occurred during the water-soak procedure. The formulas described in Example 1 were used to make the calculations.

Table 2 summarizes the results. Eighteen test specimens (2 inches by 2 inches) were also sampled from these panels and the internal bond strength of each specimen was measured using ASTM D905. The average value was 99.1 psi.

TABLE 2

Test values for wax-free oriented strand board

| SAMPLE | MOISTURE CONTENT (%) AFTER SOAKING FOR TWO DAYS | THICKNESS SWELL (%) AFTER SOAKING FOR TWO DAYS | THICKNESS SWELL (%) AFTER SOAKING FOR TWO DAYS & THEN DRYING FOR TWO DAYS |
|---|---|---|---|
| 4 | 67.1 | 21.3 | 12.6 |
| 5 | 64.8 | 21.8 | 13.8 |
| 6 | 58.9 | 21.0 | 13.7 |
| AVERAGE | 63.6 | 21.4 | 13.4 |

Example 3

A water-repelling agent according to some embodiments of the disclosure, known as 2202A, was manufactured by the International Group Incorporated at the request of the Weyerhaeuser Company and included a mixture of hydrocarbons derived from petroleum. Specifically, over 95% of the hydrocarbons were alkanes that had between 18-30 carbon atoms. About 93% of the alkanes were normal and the weight-average molecular weight of these normal alkanes was 340 Daltons. The oil content of the total mixture was about 1.4% (determined by ASTM D721) and the melt point was about 47.8° C. (determined by ASTM D87).

Oriented strand board that contained the water-repelling agent according to embodiments of the disclosure, known as 2202A, was produced on a laboratory scale in the following manner. Wooden strands (25-45 mils thick, 0.25-1.5 inches wide, 0.25-5.0 inches long, aspen and poplar species) designated as "core-layer strands" were dried to a moisture content of about 1.5-2.5% and were then transferred into a front-load, cylindrical-shaped blender compartment (2 feet depth, 6 feet diameter). The axis of rotation of the blender was parallel to the laboratory floor. The rotating interior surface of the blender compartment was equipped with pegs (2 inches height, 0.25 inches diameter). The rotation rate of the blender was set at a rate appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. The water-repelling agent according to embodiments of the disclosure, known as 2202A was heated to a temperature of 225° F. and then sprayed onto the wooden strands at a loading level of 0.25% based on the dry mass of the wood. An isocyanate-based bonding resin was then sprayed onto the strands at a loading level of 5.0% based on the dry mass of the wood. The treated core-layer strands were then removed from the blender.

Additional wooden strands (25-45 mils thick, 0.25-1.5 inches wide, 0.25-5.0 inches long, aspen and poplar species) designated as "surface-layer strands" were dried to a moisture content of about 1.5-2.5% and were then loaded into the blender compartment. The water-repelling agent according to embodiments of the disclosure, known as 2202A was heated to a temperature of 225° F. and then sprayed onto the wooden strands at a loading level of 0.25% based on the dry mass of the wood. A phenol-formaldehyde based bonding resin was then sprayed onto the strands at a loading level of 5.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24 inches and the width of the mat was also 24 inches. The strands in the surface layers were oriented in a direction that was generally parallel to one of the major axis of the mat, while the strands in the surface layer were oriented in a direction that was generally parallel to the other major axis of the mat. The mass of each of the four layers was about 1070-1085 g. The thickness of the mat was about 5 inches.

The mat, as well as the caul plate and screen that were supporting the mat, were then transferred onto the bottom platen of an open hot press. The top and bottom platens were maintained at a surface temperature of 405° F. A control system was immediately activated in order to begin closing the gap between the top and bottom platens until the distance between them was 0.719 inches. The time required to achieve this compression process was about 60 s. The maximum pressure exerted on the mat was about 500-650 psi. The gap between the platens was maintained at 0.719 inches for a period of 190 seconds and was then increased to 0.749 inches over a period of 30 seconds. The gap between the platens was then rapidly opened and the resulting, consolidated oriented strand board panel was removed from the press.

The hot oriented strand board panel was then transferred into an oven, and was maintained at a set temperature and relative humidity for a specific period of time. Three replicate panels were made in this manner. One test specimen (8 inches by 16 inches) was cut from each conditioned laboratory panel. Each test specimen was weighed and measured for thickness at five marked locations along the center of the specimen. Each test specimen was then submerged under 1 inch of water at a temperature of 20° C. for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen Based on these measurements calculations were made regarding the moisture content and the thickness swell that occurred during the water-soak procedure. The formulas described in Example 1 were used to make the calculations.

Table 3 summarizes the results. Eighteen test specimens (2 inches by 2 inches) were also sampled from these panels and the internal bond strength of each specimen was measured using ASTM D905. The average value was 97.1 psi.

TABLE 3

Test values for OSB made with conventional slack wax

| SAMPLE | MOISTURE CONTENT (%) AFTER SOAKING FOR TWO DAYS | THICKNESS SWELL (%) AFTER SOAKING FOR TWO DAYS | THICKNESS SWELL (%) AFTER SOAKING FOR TWO DAYS & THEN DRYING FOR TWO DAYS |
|---|---|---|---|
| 7 | 40.6 | 14.3 | 9.7 |
| 8 | 41.7 | 13.5 | 8.4 |
| 9 | 36.9 | 16.4 | 11.1 |
| AVERAGE | 39.7 | 14.7 | 9.7 |

Example 4

A water-repelling agent according to some embodiments of the disclosure known as 4656A, was manufactured by the International Group Incorporated at the request of the Weyerhaeuser Company and included a mixture of hydrocarbons derived from petroleum. Specifically, over 95% of the hydrocarbons were alkanes that had between 20-36 carbon atoms. About 53% of the alkanes were normal and the other 47% were branched. The weight-average molecular weight of these normal alkanes was 351 Daltons. The oil content of the total mixture was about 2.0% (determined by ASTM D721) and the melt point was about 41.7° C. (determined by ASTM D87).

Oriented strand board that contained the water-repelling agent according to embodiments of the disclosure, known as 4656A, was produced on a laboratory-scale in the following manner. Wooden strands (25-45 mils thick, 0.25-1.5 inches wide, 0.25-5.0" long, aspen and poplar species) designated as "core-layer strands" were dried to a moisture content of about 1.5-2.5% and were then transferred into a front load, cylindrical-shaped blender compartment (2 feet depth, 6 feet diameter). The axis of rotation of the blender was parallel to the laboratory floor. The rotating interior surface of the blender compartment was equipped with pegs (2 inches height, 0.25 inches diameter). The rotation rate of the blender was set at a rate appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. The water-repelling agent according to embodiments of the disclosure was heated to a temperature of 225° F. and then sprayed onto the wooden strands at a loading level of 0.25% based on the dry mass of the wood. An isocyanate-based bonding resin was then sprayed onto the strands at a loading level of 5.0% based on the dry mass of the wood. The treated core-layer strands were then removed from the blender.

Additional wooden strands (25-45 mils thick, 0.25-1.5 inches wide, 0.25-5.0 inches long, aspen and poplar species) designated as "surface-layer strands" were dried to a moisture content of about 1.5-2.5% and were then loaded into the blender compartment. The water-repelling agent according to embodiments of the disclosure was heated to a temperature of 225° F. and then sprayed onto the wooden strands at a loading level of 0.25% based on the dry mass of the wood. A phenol-formaldehyde based bonding resin was then sprayed onto the strands at a loading level of 5.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24 inches and the width of the mat was also 24 inches. The strands in the surface layers were oriented in a direction that was generally parallel to one of the major axis of the mat, while the strands in the surface layer were oriented in a direction that was generally parallel to the other major axis of the mat. The mass of each of the four layers was about 1070-1085 g. The thickness of the mat was about 5 inches.

The mat, as well as the caul plate and screen that were supporting the mat, were then transferred onto the bottom platen of an open hot press. The top and bottom platens were maintained at a surface temperature of 405° F. A control system was immediately activated in order to begin closing the gap between the top and bottom platens until the distance between them was 0.719". The time required to achieve this compression process was about 60 s. The maximum pressure exerted on the mat was about 500-650 psi. The gap between the platens was maintained at 0.719 inches for a period of 190 seconds and was then increased to 0.749 inches over a period of 30 seconds. The gap between the platens was then rapidly opened and the resulting, consolidated oriented strand board panel was removed from the press.

The hot oriented strand board panel was then transferred into an oven, and was maintained at a set temperature and relative humidity for a specific period of time. Three replicate panels were made in this manner. One test specimen (8 inches by 16 inches) was cut from each conditioned laboratory panel. Each test specimen was weighed and measured for thickness at five marked locations along the center of the specimen. Each test specimen was then submerged under 1 inch of water at a temperature of 20° C. for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen. Based on these measurements calculations were made regarding the moisture content and the thickness swell that occurred during the water-soak procedure. The formulas described in Example 1 were used to make the calculations.

Table 4 summarizes the results. Eighteen test specimens (2 inches by 2 inches) were also sampled from these panels and the internal bond strength of each specimen was measured using ASTM D905. The average value was 102 psi.

TABLE 4

Test values for OSB made with novel water repellant 4656A

| SAMPLE | MOISTURE CONTENT (%) AFTER SOAKING FOR TWO DAYS | THICKNESS SWELL (%) AFTER SOAKING FOR TWO DAYS | THICKNESS SWELL (%) AFTER SOAKING FOR TWO DAYS & THEN DRYING FOR TWO DAYS |
|---|---|---|---|
| 10 | 45.5 | 15.1 | 10.1 |
| 11 | 46.9 | 15.3 | 9.7 |
| 12 | 45.5 | 16.6 | 11.3 |
| AVERAGE | 46.0 | 15.7 | 10.4 |

Example 5

A water-repelling agent according to embodiments of the disclosure, known as R4700, was manufactured by the International Group Incorporated at the request of the Weyerhaeuser Company and included a mixture of hydrocarbons derived from petroleum. Specifically, over 95% of the hydrocarbons were alkanes that had between 18-32 carbon atoms. About 67% of the alkanes were normal and the other 33% were branched. The weight-average molecular weight of these normal alkanes was 326 Daltons. The oil content of the total mixture was about 1.2% (determined by ASTM D721) and the melt point was about 42.2° C. (determined by ASTM D87).

Oriented strand board that contained the water-repelling agent according to embodiments of the disclosure was produced on a laboratory-scale in the following manner. Wooden strands (25-45 mils thick, 0.25-1.5 inches wide, 0.25-5.0 inches long, aspen and poplar species) designated as "core-layer strands" were dried to a moisture content of about 1.5-2.5% and were then transferred into a front-load, cylindrical-shaped blender compartment (2 feet depth, 6 feet diameter). The axis of rotation of the blender was parallel to the laboratory floor. The rotating interior surface of the blender compartment was equipped with pegs (2 inches height, 0.25 inches diameter). The rotation rate of the blender was set at a rate appropriate to cause the strands to be carried to the top of the interior region of the blender compartment and to then fall to the bottom of the compartment in a cascading, "waterfall-like" action. The blender was further equipped with a spray application system for molten neat wax as well as a spray application system for liquid bonding resins. The water-repelling agent according to embodiments of the disclosure was heated to a temperature of 225° F. and then sprayed onto the wooden strands at a loading level of 0.25% based on the dry mass of the wood. An isocyanate-based bonding resin was then sprayed onto the strands at a loading level of 5.0% based on the dry mass of the wood. The treated core-layer strands were then removed from the blender.

Additional wooden strands (25-45 mils thick, 0.25-1.5 inches wide, 0.25-5.0 inches long, aspen and poplar species) designated as "surface-layer strands" were dried to a moisture content of about 1.5-2.5% and were then loaded into the blender compartment. The water-repelling agent according to embodiments of the disclosure was heated to a temperature of 225° F. and then sprayed onto the wooden strands at a loading level of 0.25% based on the dry mass of the wood. A phenol-formaldehyde based bonding resin was then sprayed onto the strands at a loading level of 5.0% based on the solids content of the resin and the dry mass of the wood. The treated surface-layer strands were then removed from the blender.

The treated strands were formed on top of a screen and caul plate into a four-layered mat that was comprised of one bottom surface layer, two middle core layers, and one top surface layer. The length of the mat was 24 inches and the width of the mat was also 24 inches. The strands in the surface layers were oriented in a direction that was generally parallel to one of the major axis of the mat, while the strands in the surface layer were oriented in a direction that was generally parallel to the other major axis of the mat. The mass of each of the four layers was about 1070-1085 g. The thickness of the mat was about 5 inches.

The mat, as well as the caul plate and screen that were supporting the mat, were then transferred onto the bottom platen of an open hot press. The top and bottom platens were maintained at a surface temperature of 405° F. A control system was immediately activated in order to begin closing the gap between the top and bottom platens until the distance between them was 0.719 inches. The time required to achieve this compression process was about 60 s. The maximum pressure exerted on the mat was about 500-650 psi. The gap between the platens was maintained at 0.719 inches for a period of 190 seconds and was then increased to 0.749 inches over a period of 30 seconds. The gap between the platens was then rapidly opened and the resulting, consolidated oriented strand board panel was removed from the press.

The hot oriented strand board panel was then transferred into an oven, and was maintained at a set temperature and relative humidity for a specific period of time. Three replicate panels were made in this manner. One test specimen (8 inches by 16 inches) was cut from each conditioned laboratory panel. Each test specimen was weighed and measured for thickness at five marked locations along the center of the specimen. Each test specimen was then submerged under 1 inch of water at a temperature of 20° C. for a period of 48 hours. Each test specimen was then removed from the water and measured for mass and thickness at each of the previously measured locations along the center of the specimen. Each test specimen was then transferred into an oven and dried at a temperature of 80° C. for a period of 48 hours. The dried specimens were also measured for mass and thickness at each of the previously measured locations along the center of the specimen. Based on these measurements calculations were made regarding the moisture content and the thickness swell that occurred during the water-soak procedure. The formulas described in Example 1 were used to make the calculations.

Table 5 summarizes the results. Eighteen test specimens (2 inches by 2 inches) were also sampled from these panels and the internal bond strength of each specimen was measured using ASTM D905. The average value was 89.0 psi.

TABLE 5

Test values for OSB made with novel water repellant R4700

| SAMPLE | MOISTURE CONTENT (%) AFTER SOAKING FOR TWO DAYS | THICKNESS SWELL (%) AFTER SOAKING FOR TWO DAYS | THICKNESS SWELL (%) AFTER SOAKING FOR TWO DAYS & THEN DRYING FOR TWO DAYS |
|---|---|---|---|
| 13 | 46.6 | 17.2 | 12.5 |
| 14 | 52.9 | 19.3 | 12.7 |
| 15 | 48.4 | 17.4 | 12.2 |
| AVERAGE | 49.3 | 18.0 | 12.5 |

We claim:

1. A wood composite comprising:
   cellulosic particles present from approximately 50% to approximately 99.5% on a dry mass basis;
   a binder present from approximately 0.1% to approximately 20% on a dry mass basis; and
   a water-repelling agent present from approximately 0.1% to approximately 5.0% on a dry mass basis;
   wherein the water-repelling agent is a neat wax comprising a mixture of aliphatic compounds having a molecular distribution between about 16 and about 36 carbon atoms per molecule;
   wherein the water-repelling agent has a solids component and an oil content of about 0%, and wherein the solids component has an average molecular weight of about 220 to about 350 Daltons; and
   wherein the water-repelling agent has a melt point between about 18° C. and about 45° C.

2. The wood composite of claim 1 wherein the water-repelling agent is petroleum-derived.

3. The wood composite of claim 1 wherein the water-repelling agent is effective to inhibit water absorption in the wood composite so that a sample of the wood composite having dimensions of 8 inches by 16 inches by 0.72 inch has a moisture content of about 40% after immersion in water for about 48 hours and an internal bond strength of approximately 88 psi.

4. The wood composite of claim 1 wherein the water-repelling agent further comprises additional compounds, the additional compounds being selected from the group consisting of aromatic compounds, alkenes, alkynes, alkanes having a molecular distribution less than about 16 carbon atoms per molecule, alkanes having a molecular distribution greater than about 36 carbon atoms per molecule, and other organic compounds.

5. The wood composite of claim 1 wherein the aliphatic compounds are an alkane mixture.

6. The wood composite of claim 5, wherein the alkane mixture comprises about 70% to about 93% normal alkanes.

7. The wood composite of claim 5, wherein the alkane mixture comprises:
   about 7% to about 47% branched alkanes; and
   about 53% to about 93% normal alkanes.

8. The wood composite of claim 1 wherein the wood composite is selected from the group consisting of particleboard, fiberboard, oriented strand board, laminated strand lumber, plywood, laminated veneer lumber, and parallel strand lumber.

9. A method for making a wood composite comprising:
   forming a wood composite formulation, the wood composite formulation comprising:
   cellulosic particles present from approximately 50% to approximately 99.5% on a dry mass basis;
   a binder present from approximately 0.1% to approximately 20% on a dry mass basis; and
   a water-repelling agent present from approximately 0.1% to approximately 5.0% on a dry mass basis; and
   compressing the wood composite formulation under heat and pressure to form a wood composite;
   wherein the water-repelling agent is a neat wax comprising a mixture of aliphatic compounds having a molecular distribution between about 16 and about 36 carbon atoms per molecule;
   wherein the water-repelling agent has a solids component and an oil content of about 0%, and wherein the solids component has an average molecular weight of about 220 to about 350 Daltons; and wherein the water-repelling agent has a melt point between about 18° C. and about 45° C.

10. The method of claim 9 wherein the wood composite is selected from the group consisting of particleboard, fiberboard, oriented strand board, laminated strand lumber, plywood, laminated veneer lumber, and parallel strand lumber.

11. The method of claim 9 wherein the aliphatic compounds are an alkane mixture.

12. The method of claim 11, wherein the alkane mixture comprises about 70% to about 93% normal alkanes.

13. The method of claim 11, wherein the alkane mixture comprises:
   about 7% to about 47% branched alkanes; and
   about 53% to about 93% normal alkanes.

14. The method of claim 9, further comprising performing one or more post-compression steps on the wood composite, the post compression steps being selected from the group consisting of trimming, sawing, grading, sorting, sanding, marking, labeling, stacking, sealing, packaging, and shipping.

15. The method of claim 9, wherein the water-repelling agent further comprises additional compounds, the additional compounds being selected from the group consisting of aromatic compounds, alkenes, alkynes, alkanes having a molecular distribution less than about 16 carbon atoms per molecule, alkanes having a molecular distribution greater than about 36 carbon atoms per molecule, and other organic compounds.

\* \* \* \* \*